US012743503B2

(12) United States Patent
Chang et al.

(10) Patent No.: US 12,743,503 B2
(45) Date of Patent: Sep. 22, 2026

(54) PRIVILEGED SEMI-CONTAINERIZED SYSTEM SERVICES FOR DEVELOPING AND DEPLOYING EMBEDDED APPLICATIONS

(71) Applicant: Dell Products L.P., Round Rock, TX (US)

(72) Inventors: Ching-Jye Chang, Cedar Park, TX (US); Jack Elmer Fewx, Austin, TX (US); Jitendra Gul Jagasia, Round Rock, TX (US); Michael Emery Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/780,097

(22) Filed: Jul. 22, 2024

(65) Prior Publication Data

US 2026/0023843 A1 Jan. 22, 2026

(51) Int. Cl.
*G06F 21/53* (2013.01)
*G06F 21/51* (2013.01)
(Continued)

(52) U.S. Cl.
CPC .............. *G06F 21/53* (2013.01); *G06F 21/51* (2013.01); *G06F 9/45504* (2013.01); *G06F 9/5077* (2013.01)

(58) Field of Classification Search
CPC ........ G06F 21/53; G06F 9/45558; G06F 8/63; G06F 9/455; G06F 9/545; G06F 9/5077;
(Continued)

(56) References Cited

U.S. PATENT DOCUMENTS 11,875,167 B2 * 1/2024 Gray .................... G06F 9/45516
12,204,646 B2 * 1/2025 Mishra Gupta ..... G06F 9/45558
(Continued)

FOREIGN PATENT DOCUMENTS

CN 117076005 A * 11/2023 ......... G06F 9/44505

OTHER PUBLICATIONS

Ankush Das, "Linux Jargon Buster: What is Flatpak? Everything Important You Need to Know About This Universal Packaging System", obtained online from <https://web.archive.org/web/20201029080735/https://itsfoss.com/what-is-flatpak/>, retrieved on Dec. 13, 2025. (Year: 2022).*
(Continued)

*Primary Examiner* — Zhimei Zhu
(74) *Attorney, Agent, or Firm* — Jackson Walker L.L.P.

(57) ABSTRACT

Disclosed subject matter encompasses method operations performed by an embedded device. Exemplary deployments may include a BMC as the embedded device, but the embedded device is expressly not limited to BMCs. Disclosed subject matter enables partially-sandboxed execution environments (SSEEs) with an auditable framework supporting unrestricted or restricted system access via privilege elevation capabilities not generally permitted within conventional container solutions. Functional modularity is implemented without incurring the substantial overhead inherent in fully modular and isolated containers. Disclosed SSEEs require no intermediate runtime or the corresponding overhead. Disclosed subject matter may leverage sandboxing functionality native to at least some software package management utilities (SPMUs) including, as a non-limiting example, a Flatpak utility suitable for use in embodiments employing a Linux OS, to achieve footprint-efficient SSEEs.

20 Claims, 3 Drawing Sheets

(51) Int. Cl.
*G06F 9/455* (2018.01)
*G06F 9/50* (2006.01)

(58) Field of Classification Search
CPC ............. G06F 9/45537; G06F 9/45504; G06F 2009/45562
See application file for complete search history.

(56) References Cited

U.S. PATENT DOCUMENTS

| | | | | |
|---|---|---|---|---|
| 12,335,344 | B2 * | 6/2025 | Chibon | H04L 67/141 |
| 2010/0180108 | A1 * | 7/2010 | Liu | G06F 11/1433 713/2 |
| 2018/0267990 | A1 * | 9/2018 | Cherukuri | G06F 8/60 |
| 2021/0011740 | A1 * | 1/2021 | Lu | G06F 9/4881 |
| 2021/0073374 | A1 * | 3/2021 | Mookken | G06F 21/54 |
| 2023/0409716 | A1 * | 12/2023 | Mishra Gupta | G06F 21/57 |
| 2024/0367598 | A1 * | 11/2024 | Chibon | B60R 16/023 |
| 2025/0085961 | A1 * | 3/2025 | Thakur | G06F 8/656 |
| 2025/0130875 | A1 * | 4/2025 | Telschig | G06F 8/656 |
| 2025/0217130 | A1 * | 7/2025 | Gupta | G06F 9/547 |

OTHER PUBLICATIONS

L. Coppolino, S. D'Antonio, G. Mazzeo, R. Nardone, L. Romano and M. Schmitt, "Wasmbox: A Lightweight Wasm-Based Runtime for Trustworthy Multi-Tenant Embedded Systems," in IEEE Transactions on Emerging Topics in Computing, vol. 13, No. 2, pp. 467-480, Date of publication Jun. 18, 2024 (Year: 2024).*

* cited by examiner 320-2

/
610
|-- app/ ----> /usr/ libexec/ flatpak/app/thermal/arm/rel-17g-main/active/files/
602-2
|-- bin/...
604-2
|-- sbin/... ←630
|-- lib/...
|-- /usr/ libexec/ flatpak/app/power/arm/rel-17g-main/active/files/
-- |bin
-- |sbin
-- |lib
|-- /usr/ libexec/ flatpak /app/thermal/arm/rel-17g-main/active/files/
-- |bin ←620-2
-- |sbin
-- |lib
`-- ...
thermal sandbox

PRIVILEGED SEMI-CONTAINERIZED SYSTEM SERVICES FOR DEVELOPING AND DEPLOYING EMBEDDED APPLICATIONS

TECHNICAL FIELD

The present disclosure is in the field of information handling systems and, more specifically, system services for developing and deploying embedded applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An original equipment manufacturer (OEM) of information handling systems may combine hardware and software from third party vendors with OEM-specific hardware and/or software resources. A server class information handling system, as an illustrative example, may include general purpose processors and a chipset from Intel, an operating system from Microsoft, and an OEM-specific system management controller, also referred to as a baseboard management controller (BMC) and/or remote access controller (RAC). The integrated Dell Remote Access Controller (iDRAC) family of management controllers from Dell Technologies are commercially distributed and well known examples of a BMC.

Cost issues and other considerations may result in OEM-specific resources implemented with an OEM-developed open source software platform running on minimally-provisioned hardware to enable specifically defined functionality in support of a host system. Such resources may be referred to herein simply as embedded resources or, in the case of embedded resources implemented in hardware, embedded devices.

Advances in features and services supported by at least some embedded resources, including BMCs, coupled with dramatic expansions in cloud computing, data mining, cryptographic applications, artificial intelligence, Internet of things (IoT) and edge computing, etc., have increased the technical and commercial importance of BMCs and other embedded resources. Generally, however, the motivation to implement cost efficient embedded devices via minimally-provisioned, specifically defined functionality, is often in tension with the growing need for frameworks and tools for developing and maintaining embedded resource application programs, referred to herein simply as applications or embedded applications.

SUMMARY

The previously discussed issues associated with developing and maintaining applications for embedded devices are addressed by disclosed methods and systems enabling partially-sandboxed execution environments, referred to herein as semi-sandboxed execution environments (SSEEs), with an auditable framework supporting unrestricted or restricted system access via privilege elevation capabilities not generally permitted within conventional container solutions. Further, unlike fully integrated package management utilities including rpm, deb, and msi, as examples, disclosed methods and systems retain functional modularity without incurring the substantial overhead inherent in fully modular and isolated containers. Disclosed sandboxes require no intermediate runtime and the corresponding overhead.

Disclosed systems and methods may leverage sandboxing functionality native to at least some software package management utilities (SPMUs) including, as a non-limiting example, a Flatpak utility, to achieve footprint-efficient SSEEs.

In at least one aspect, disclosed subject matter encompasses a method or process corresponding to operations performed by an embedded device. Exemplary deployments described herein may feature a BMC as the embedded device, but the embedded device is expressly not limited to BMCs.

Initially, the embedded device may execute a boot sequence in response to a reset, configuration reload, or the like. In at least one embodiment, the boot sequence loads an operating system (OS) infrastructure, including an OS and one or more OS libraries, and generates one or more configuration files, each of which describes and/or defines behavior for a corresponding embedded application. For embodiments in which the embedded device is a BMC, the embedded application may implement a system service for any of numerous functions and capabilities supported by the BMC. BMC functions described herein include power management and thermal management functions, but these are merely illustrative and non-limiting examples.

In at least some embodiments disclosed herein, the OS is a Linux OS and the configuration files are dynamically generated unit files. In such embodiments, the bundled libraries may be characterized as ephemeral libraries that are not persisted beyond the present boot. In at least some Linux OS embodiments that employ a systemd/init, each dynamically generated unit file may correspond to a systemd generator executed early in the boot sequence, e.g., before static unit files are loaded.

When an embedded application is launched, the embedded device creates or otherwise establishes an SSEE corresponding to the application and executes the application within the SSEE. In at least one embodiment, the SSEE encompasses one or more bundled libraries, i.e., libraries provided with the application code, and one or more of the OS libraries.

The bundled libraries may be implemented as file system overlays wherein the bundled libraries are preferentially checked before the OS libraries. If, for example, a particular filename is present in the bundled libraries as well as the OS libraries, references to the filename are interpreted and/or executed as references to the bundled library file. References to any filenames not found in the bundled libraries are fulfilled via the OS libraries. In this manner, the bundled libraries modify and extend the OS libraries. In at least some embodiments, references that are not valid in either of the libraries raise an exception because there is no intermediate or alternative library or runtime image.

In at least some embodiments, the embedded device may include and leverage sandboxing capabilities native to an SPMU. In such embodiments, an embedded application may represent an SPMU-compliant build of application code. In at least one embodiment, for example, the SPMU is a Flatpak SPMU and the embedded application may be referred to as a Flatpak application. In Flatpack embodiments, the SSEE may be configured by creating a mount namespace corresponding to a host namespace for the Flatpak application and mounting a root/app for the Flatpak application to the mount namespace.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
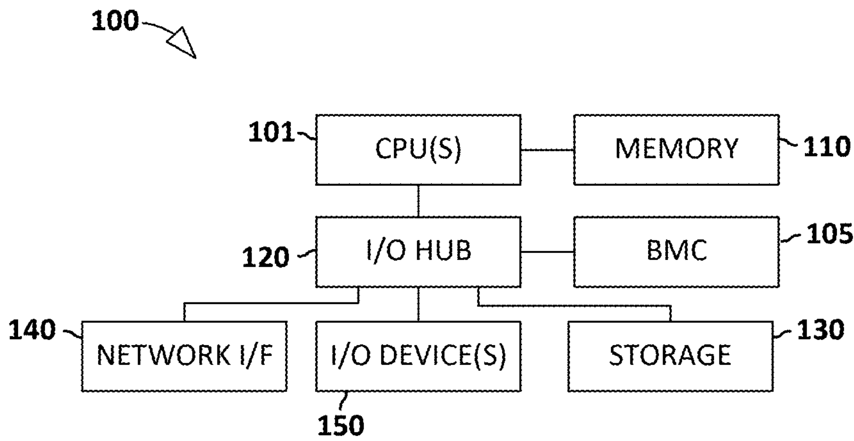
FIG. 1 illustrates an information handling system, including an embedded device in accordance with disclosed subject matter.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

The following detailed description of the drawings includes references to specific instances or implementations of certain features, elements, and/or components including, without limitation, references to: Linux as an exemplary operating system, systemd as an exemplary init system, Flatpak as an exemplary SPMU, and BMC as an exemplary embedded resource. Such references are made for purposes of clarity and brevity and are non-limiting unless expressly indicated otherwise.

Referring now to the drawing figures, FIG. 1 depicts an information handling system 100 suitable for use in conjunction with subject matter disclosed in FIG. 2 through FIG. 6. The illustrated information handling system includes one or more general purpose processors or central processing units (CPUs) 101 communicatively coupled to a memory resource 110 and to an input/output hub 120 to which various I/O resources and/or components are communicatively coupled. The I/O resources explicitly depicted in FIG. 1 include a network interface 140, commonly referred to as a NIC (network interface card), storage resources 130, and additional I/O devices, components, or resources 150 including as non-limiting examples, keyboards, mice, displays, printers, speakers, microphones, etc. The information handling system 100 of FIG. 1 includes an embedded device in the form of a BMC 105. BMC 105 may provide system management services enabling IT administrators to monitor and update information handling system 100. As an example, BMC 105 may monitor and budget server power based on workload needs and thermal conditions. BMC 105 may include a processor, memory, an out-of-band network interface separate from and physically isolated from an in-band network interface of information handling system 100, and/or other embedded information handling resources. BMC 105 may be one of two or more BMCs coupled to a management server enabling remote, out-of-band management of information handling system 100 even when information handling system 100 is powered off or powered to a standby state. In certain embodiments, BMC 105 may include or may be an integral part of a remote access controller or a chassis management controller.

Figure 2:
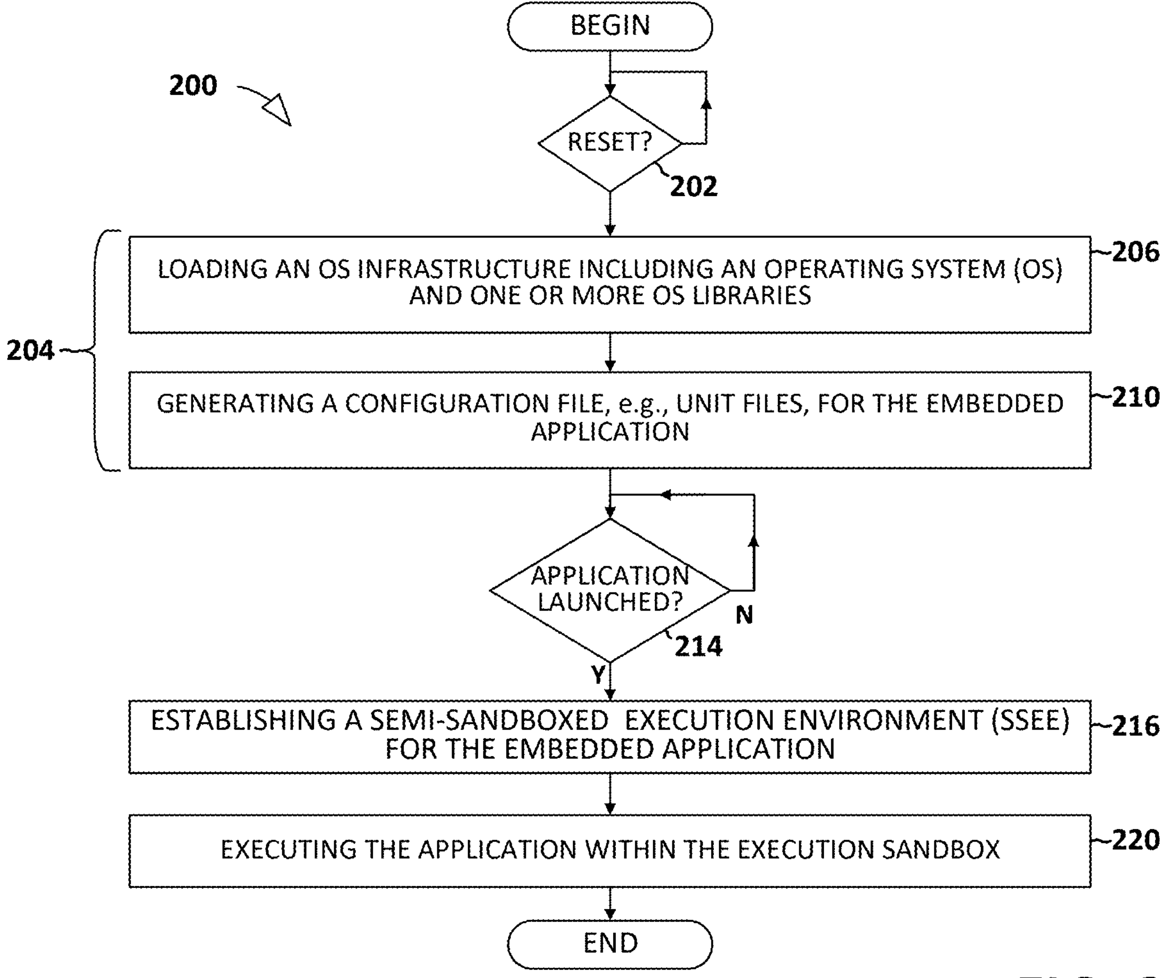
FIG. 2 illustrates a flow diagram of a method for enabling disclosed SSEEs for an embedded device.

Referring now to FIG. 2, the depicted flow diagram illustrates a method 200 for implementing semi-containerized execution environments within an embedded device to facilitate development and deployment of embedded device applications. Additional details regarding operations of the method 200 depicted in FIG. 2 are provided in the subsequent drawing figures and the accompanying descriptions.

In at least some embodiments, method 200 leverages sandboxing functionality native to an SPMU to enable resource-efficient isolated execution environments. In this manner, method 200 achieves application program insulation with an appreciably smaller runtime footprint than conventional server-side containerization.

In at least one embodiment, the flow diagram elements of the illustrated method 200 correspond to operations performed by an embedded device in accordance with disclosed subject matter pertaining to the creation of SSEEs for use in conjunction with embedded applications. Performance of the depicted method is triggered (operation 202) by any suitable initialization event such as a reset, a configuration reload, or the like. The embedded device performing method 200 responds to detecting the reset by performing boot sequence operations (204). The boot sequence operations (204) illustrated in FIG. 2 include loading (operation 206) an OS infrastructure that includes an OS and one or more OS libraries and generating (operation 210) a configuration file corresponding to an embedded application. The configuration file may include directives describing and/or defining behavior for an application or service associated with the embedded device. For implementations that include a Linux OS and a systemd/init, the configuration file may comprise a dynamically generated unit file, symlink, or unit file drop-in that can be loaded and operated on by systemd within the current boot. Such embodiments may include a systemd generator corresponding to each of one or more embedded applications.

After performing boot sequence operations (204) the embedded device may detect (operation 214) a launch of the embedded application and respond by configuring (operation 216) an SSEE for to the application. In at least some embodiments, the SSEE comprises a hybrid filesystem image that includes the embedded application's bundled libraries overlaying the OS libraries. After the SSEE is created, the illustrated method 200 concludes by executing (operation 220) the embedded application within the SSEE.

Figure 3:
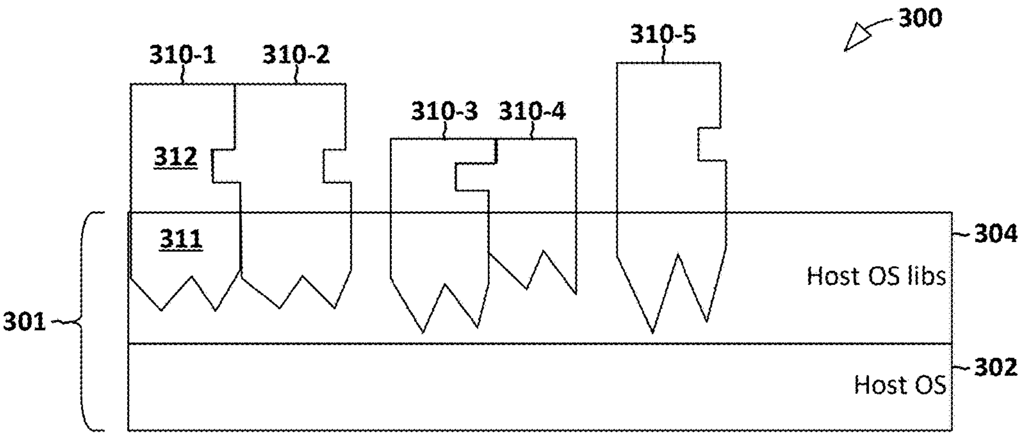
FIG. 3 illustrates an exemplary runtime image of a software implementation within an embedded device.

Referring now to FIG. 3, a runtime image 300 illustrating an exemplary configuration of multiple SSEEs 310 is presented. In at least some embodiments, runtime image 300 reflects software executing within a BMC or other suitable embedded device. The runtime image 300 depicted in FIG. 3 includes the SSEE 310 and an OS infrastructure 301, comprised of a host OS 302, e.g., a Linux OS, and host OS lib resources 304. Each SSEE 310 depicted in FIG. 3 may represent an instance of an embedded application. Although FIG. 3 depicts an implementation featuring five SSEEs, 310-1 through 310-5, other embodiments may include more, fewer, and/or different SSEEs 310.

Each SSEE 310 depicted in FIG. 3 encompasses a combination of library resources including one or more host OS libraries 311 and application-native libraries referred to herein as bundled libraries 312. Thus, each SSEE 310 depicted in FIG. 3 adds to and shares from OS infrastructure 301, without implementing any additional shared or common runtime, or any intermediate runtime. In addition, FIG. 3 reflects an implementation in which SSEEs 310 implement differing degrees of modularity, as reflected by the ratio of bundled libraries 312 to host OS libraries 311. In this manner, the illustrated runtime image 300 depicted in FIG. 3 enables desirably modular and isolated applications without the overhead of a conventional hypervisor, VM, or other form of intermediate runtime.

By leveraging OS infrastructure 301 as the runtime foundation for a plurality of SSEEs 310, the runtime image 300 illustrated in FIG. 3 omits much of the conventional sandbox structure and, accordingly, beneficially conserves compute and storage resources while allowing fully integrated sandboxes as well.

As conveyed in FIG. 3, the extent to which an application corresponding to an SSEE 310 relies on lib resources shared with the other applications can vary considerably. While some SSEEs 310 may rely heavily on shared lib resources, other applications may rely primarily on its own bundled lib resources. In this manner, the illustrated software 300 beneficially enables an application developer to control when and how an application associated with an SSEE 310 interacts with and/or has a lasting impact on the applicable information handling system.

SSEEs 310 may be instantiated via startup units as described in more detail below with respect to FIG. 5. In addition, bundled libraries 312 may be deployed in an ephemeral manner as file system overlays to facilitate seamless addition, removal, replacement, or temporarily override of different application versions. In such embodiments, disclosed methods and systems may leverage filesystem overlay functionality naïve to an SPMU utility such as a Flatpak utility.

Figure 4:
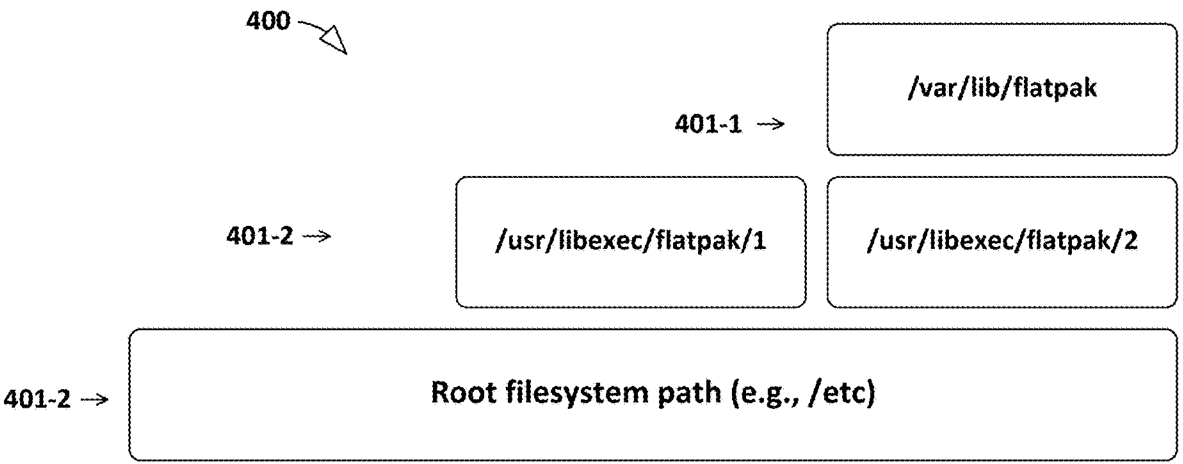
FIG. 4 illustrates overlay file system features of an SPMU.

Referring now to FIG. 4, overlay features of an exemplary SPMU are represented. The overlay filesystem 400 depicted in FIG. 4 includes multiple priority layers 401-1, 401-2, and 401-3 where programs and users see the summation of priority layers 401. The lowest layer, layer 401-1, is the root filesystem. In an embodiment that utilizes Flatpak as the SPMU, files exported by installed Flatpak apps are installed by default into the rootfs image represented by the second layer 401-2. The top layer depicted in FIG. 4, layer 401-3, corresponds to developer runtime installed Flatpaks. In the overlay filesystem of FIG. 4, files with no matches at higher layers "show through" from the lower layer.

Figure 5:
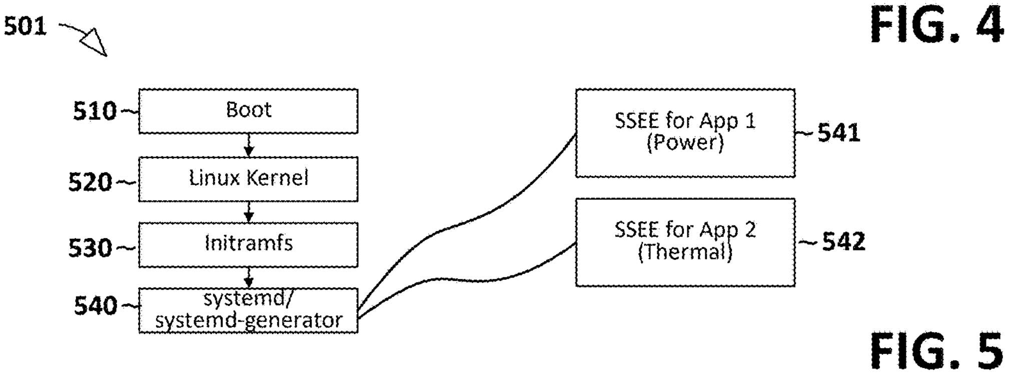
FIG. 5 illustrates an exemplary embedded device boot sequence.

FIG. 5 illustrates a boot sequence 501, which may be performed by the BMC 105 or another suitable embedded device. The boot sequence 501 depicted in FIG. 5 is a Linux boot sequence in which a Linux kernel is loaded (operation 520) in response to a system reset or other suitable boot trigger 510. An initramfs (operation 530) is then performed to mount the root filesystem. For embodiments featuring a systemd init, FIG. 5 illustrates execution (operation 540) of one or more systemd generators. For the particular case of a BMC, FIG. 5 illustrates systemd generators corresponding to each of one or more BMC features, functions, or modules. Each systemd generator enables dynamically generated unit files for the applicable modules including, as depicted in FIG. 5, a power module 541 and a thermal module 542. Other embodiments may include more, fewer, and/or different BMC modules.

Figure 6:
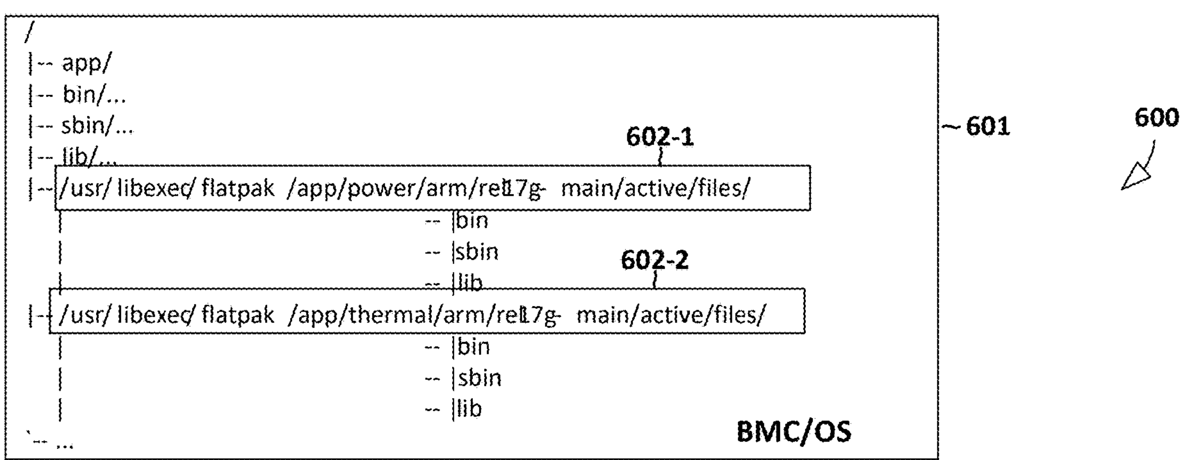
FIG. 6 illustrates creation of SSEEs in accordance with disclosed subject matter.
Figure 6:
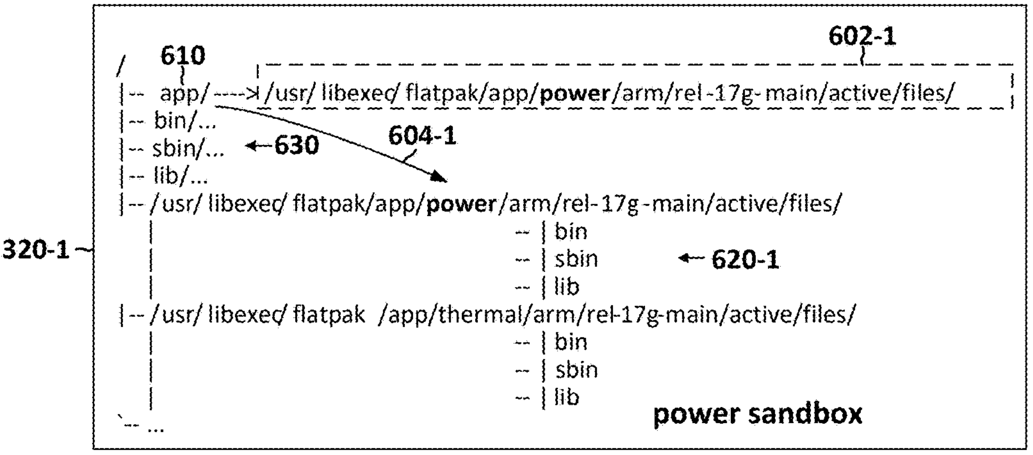

FIG. 6 illustrates aspects of a method 600 for establishing isolated SSEEs for Flatpak applications in accordance with disclosed subject matter. In at least some embodiments, when a Flatpak application is started, a mount namespace that mirrors the namespace 602 within the BMC OS 601 is created. In the depicted example, the namespace 602 corresponds to the repository of the applicable Flatpak application. The method 600 depicted in FIG. 6 then mounts (operation 604) the/app 610 within the applicable SSEE 310 to the created namespace. In this manner, executables and libraries within bin/sbin/lib/620 under app/610 will be used before checking the bin/sbin/lib 630 under the root file path.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of operation for an embedded device, the method comprising:

responsive to a reset of the embedded device, performing boot sequence operations including:

loading an operating system (OS) infrastructure including an operating system (OS) and one or more OS libraries; and generating a configuration file including one or more directives defining an application associated with the embedded device;

responsive to detecting a launch of the application, configuring a semi-sandboxed execution environment (SSEE) corresponding to the application without an intermediate runtime between the application and the OS infrastructure, the SSEE encompassing:

one or more bundled libraries comprising libraries bundled with the application; and the one or more OS libraries; and executing the application within the SSEE.

2. The method of claim 1, wherein the one or more bundled libraries comprise file system overlays wherein the SSEE checks the bundled libraries for a particular filename before checking the OS libraries.

3. The method of claim 1, wherein the one or more bundled libraries comprise ephemeral libraries that are not persisted beyond a next reset of the embedded device.

4. The method of claim 1, wherein the OS comprises a Linux OS and the configuration file comprises a dynamically generated unit file.

5. The method of claim 4, wherein the embedded device is provisioned with a software package management utility (SPMU) and the application comprises an SPMU-compliant build of application code.

6. The method of claim 5, wherein the SPMU is a Flatpak SPMU and the application is a Flatpak application.

7. The method of claim 6, wherein the Linux OS includes a Systemd/init including a systemd generator for the Flatpak application.

8. The method of claim 7, wherein configuring the SSEE includes:

creating a mount namespace corresponding to a host namespace for the Flatpak application; and mounting a root/app for the Flatpak application to the mount namespace.

9. The method of claim 1, wherein the embedded device comprises a baseboard management controller (BMC).

10. The method of claim 9, wherein the application corresponds to a system management service.

11. An information handling system, comprising:

a central processing unit;

a system memory; and an embedded device including a computer readable storage medium including program instructions that, when executed by a processor of the embedded device, cause the embedded device to perform operations including:

responsive to a reset, performing boot sequence operations including:

loading an operating system (OS) infrastructure including an operating system (OS) and one or more OS libraries; and generating a configuration file including one or more directives defining an application associated with the embedded device;

responsive to detecting a launch of the application, configuring a semi-sandboxed execution environment (SSEE) corresponding to the application without an intermediate runtime between the application and the OS infrastructure, the SSEE encompassing:

one or more bundled libraries comprising libraries bundled with the application; and the one or more OS libraries; and executing the application within the SSEE.

12. The information handling system of claim 11, wherein the one or more bundled libraries comprise file system overlays wherein the SSEE prioritizes executables in the bundled libraries over same-named executables in the OS libraries.

13. The information handling system of claim 11, wherein the one or more bundled libraries comprise ephemeral libraries that persist only for a current boot tenure.

14. The information handling system of claim 11, wherein the OS comprises a Linux OS and the configuration file comprises a dynamically generated unit file.

15. The information handling system of claim 14, wherein the embedded device is provisioned with a software package management utility (SPMU) and the application comprises an SPMU-compliant build of application code.

16. The information handling system of claim 15, wherein the SPMU is a Flatpak SPMU and the application is a Flatpak application.

17. The information handling system of claim 16, wherein the Linux OS includes a Systemd/init including a systemd generator for the Flatpak application.

18. The information handling system of claim 17, wherein configuring the SSEE includes:

creating a mount namespace corresponding to a host namespace for the Flatpak application; and mounting a root/app for the Flatpak application to the mount namespace.

19. The information handling system of claim 11, wherein the embedded device comprises a baseboard management controller (BMC).

20. The information handling system of claim 19, wherein the application corresponds to a system management service.

* * * * *